US009826865B2

(12) United States Patent
Maruyama et al.

(10) Patent No.: US 9,826,865 B2
(45) Date of Patent: Nov. 28, 2017

(54) HAND DRYER APPARATUS

(71) Applicant: Mitsubishi Electric Corporation, Chiyoda-ku (JP)

(72) Inventors: Masayoshi Maruyama, Tokyo (JP); Yoshihiro Fukaya, Tokyo (JP); Tatsuya Fujimura, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 15/108,646

(22) PCT Filed: Feb. 27, 2014

(86) PCT No.: PCT/JP2014/054859
§ 371 (c)(1),
(2) Date: Jun. 28, 2016

(87) PCT Pub. No.: WO2015/128987
PCT Pub. Date: Sep. 3, 2015

(65) Prior Publication Data
US 2016/0338554 A1 Nov. 24, 2016

(51) Int. Cl.
A47K 10/48 (2006.01)
G01F 23/26 (2006.01)

(52) U.S. Cl.
CPC ............ *A47K 10/48* (2013.01); *G01F 23/268* (2013.01)

(58) Field of Classification Search
CPC ........ A47K 10/48; A47K 1/04; G01F 23/268; E03C 1/01

(Continued)

(56) References Cited

U.S. PATENT DOCUMENTS 6,038,786 A * 3/2000 Aisenberg .............. A47K 10/48
34/202
6,320,282 B1 11/2001 Caldwell
(Continued)

FOREIGN PATENT DOCUMENTS

CN 2528043 Y 12/2002
EP 2667156 A1 11/2013
(Continued)

OTHER PUBLICATIONS

Office Action (Notice of Rejection) dated Feb. 21, 2017, by the Japanese Patent Office in corresponding Japanese Patent Application No. 2016-504931, and an English Translation of the Office Action. (5 pages).

(Continued)

*Primary Examiner* — Stephen M Gravini
(74) *Attorney, Agent, or Firm* — Buchanan Ingersoll & Rooney PC

(57) ABSTRACT

A hand dryer includes a housing including a hand insertion portion and nozzles communicating with the hand insertion portion, a high-pressure air stream generation device placed inside the housing, hand detection sensors detecting a user's hand inserted into the hand insertion portion, a control unit that, when the hand detection sensors detect the user's hand, operates the high-pressure air stream generation device to cause an air stream to jet out from the nozzles, and a drain tank collecting droplets blown off the user's hand and scattered in the hand insertion portion. The hand dryer includes a drain conductive plate placed to face the top surface of the drain tank and a control circuit detecting the water level of the drain tank based on capacitance generated in the drain conductive plate.

8 Claims, 8 Drawing Sheets

(58) Field of Classification Search
USPC .................................................. 34/89; 4/654
See application file for complete search history.

(56) References Cited

U.S. PATENT DOCUMENTS

| | | | |
|---|---|---|---|
| 6,713,897 B2 | 3/2004 | Caldwell | |
| 6,897,390 B2 | 5/2005 | Caldwell et al. | |
| 7,030,513 B2 | 4/2006 | Caldwell | |
| 7,098,414 B2 | 8/2006 | Caldwell | |
| 7,218,498 B2 | 5/2007 | Caldwell | |
| 7,242,393 B2 | 7/2007 | Caldwell | |
| 7,260,438 B2 | 8/2007 | Caldwell et al. | |
| 7,361,860 B2 | 4/2008 | Caldwell | |
| 7,437,833 B2 * | 10/2008 | Sato | A47K 10/48 34/90 |
| 7,532,131 B2 | 5/2009 | Schaefer et al. | |
| 7,614,160 B2 * | 11/2009 | Kameishi | A47K 10/48 34/90 |
| 7,840,286 B2 | 11/2010 | Caldwell et al. | |
| RE42,199 E | 3/2011 | Caldwell | |
| 7,906,875 B2 | 3/2011 | Caldwell et al. | |
| 7,946,055 B2 * | 5/2011 | Churchill | A47K 10/48 134/26 |
| 7,971,368 B2 * | 7/2011 | Fukaya | A47K 10/48 222/1 |
| 8,135,482 B2 | 3/2012 | Caldwell et al. | |
| 8,201,344 B2 * | 6/2012 | Sawabe | A47K 10/48 132/73.5 |
| 8,227,940 B2 | 7/2012 | Caldwell et al. | |
| 8,307,549 B2 | 11/2012 | Caldwell et al. | |
| 8,341,853 B2 * | 1/2013 | French | A47K 10/48 15/300.1 |
| 8,347,521 B2 * | 1/2013 | Churchill | A47K 10/48 134/26 |
| 8,490,291 B2 * | 7/2013 | Churchill | A47K 10/48 222/1 |
| 8,850,713 B2 * | 10/2014 | Nakamura | A47K 10/48 132/73 |
| 8,997,271 B2 * | 4/2015 | Bayley | A47K 10/48 4/638 |
| 9,306,561 B2 | 4/2016 | Caldwell et al. | |
| 9,317,164 B2 | 4/2016 | Suwald | |
| 9,538,886 B2 * | 1/2017 | Ros Marin | A47K 10/48 |
| 2003/0033669 A1 * | 2/2003 | Fernie | A47K 10/48 4/619 |
| 2008/0263889 A1 | 10/2008 | Fukaya et al. | |
| 2008/0313919 A1 | 12/2008 | Churchill et al. | |
| 2010/0218978 A1 | 9/2010 | Caldwell et al. | |
| 2011/0023319 A1 | 2/2011 | Fukaya et al. | |
| 2013/0025045 A1 * | 1/2013 | Gagnon | A47K 1/04 4/654 |
| 2013/0086741 A1 * | 4/2013 | Bayley | A47K 4/00 4/623 |
| 2014/0152610 A1 | 6/2014 | Suwald | |
| 2015/0052678 A1 * | 2/2015 | Bayley | A47K 10/48 4/638 |
| 2015/0135429 A1 * | 5/2015 | Dyson | A47K 10/48 4/678 |
| 2016/0338554 A1 * | 11/2016 | Maruyama | G01F 23/268 |
| 2017/0007081 A1 * | 1/2017 | Homma | A47K 10/48 |

FOREIGN PATENT DOCUMENTS

| | | | |
|---|---|---|---|
| EP | 3 111 816 A1 * | 1/2017 | |
| JP | 4-203714 A | 7/1992 | |
| JP | 2001-4166 A | 1/2001 | |
| JP | 2001327433 A | 11/2001 | |
| JP | 2002034853 A | 2/2002 | |
| JP | 2004-154288 A | 6/2004 | |
| JP | 2004-313219 A | 11/2004 | |
| JP | 2006097924 A | 4/2006 | |
| JP | 2008192336 A | 8/2008 | |
| JP | 2009-74541 A | 4/2009 | |
| JP | 2010193492 A | 9/2010 | |
| JP | 2013-99396 A | 5/2013 | |
| JP | 2015-128987 | * 3/2017 | |
| TW | 200704387 A | 2/2007 | |
| TW | 200744515 A | 12/2007 | |
| TW | 200944169 A | 11/2009 | |
| TW | 201222359 A1 | 6/2012 | |
| TW | M461864 U1 | 9/2013 | |
| WO | WO 2015/128987 | * 9/2015 | |

OTHER PUBLICATIONS

Office Action (Notice of Rejection) dated Feb. 28, 2017, by the Japanese Patent Office in corresponding Japanese Patent Application No. 2016-504932, and a Partial English Translation of the Office Action. (6 pages).

International Search Report (PCT/ISA/210) dated May 27, 2014, by the Japanese Patent Office as the International Searching Authority for International Application No. PCT/JP2014/054859.

Written Opinion (PCT/ISA/237) dated May 27, 2014, by the Japanese Patent Office as the International Searching Authority for International Application No. PCT/JP2014/054859.

Notice of Rejection (corresponding to PCT/JP2014/054859) dated Dec. 15, 2015 in the corresponding Taiwanese Application No. 103131107.

Notice of Rejection (corresponding to PCT/JP2014/054860) dated Dec. 15, 2015 in the corresponding Taiwanese Application No. 103131108.

Notice of Rejection (corresponding to PCT/JP2014/054861) dated Dec. 23, 2015 in the corresponding Taiwanese Application No. 103131109.

Notice of Rejection (corresponding to PCT/JP2014/054863) dated Dec. 14, 2015 in the corresponding Taiwanese Application No. 103131110.

Notice of Rejection (corresponding to PCT/JP2014/054862) dated Dec. 18, 2015 in the corresponding Taiwanese Application No. 103131111.

Office Action (Communication) dated Jul. 5, 2017, by the European Patent Office in corresponding European Patent Appl. No. 14884047.3. (7 pages).

Extended European Search Report dated Sep. 29, 2017, issued by the European Patent Office in corresponding European Application No. EP 14883986 (8 pages).

Office Action (Notification of Reasons for Refusal) dated Oct. 3, 2017, by the Japanese Patent Office in corresponding Japanese Patent Application No. 2016-504932, and English Translation of the Office Action. (5 pages).

* cited by examiner

RELATIONSHIP BETWEEN WATER LEVEL IN TANK AND CAPACITANCE

HAND DRYER APPARATUS

FIELD

The present invention relates to a hand dryer apparatus that dries wet hands after they are washed.

BACKGROUND

Instead of wiping wet hands with a towel, a handkerchief, or the like after they are washed, conventional hand dryer apparatuses have been used that include a hand drying chamber into which wet hands are inserted, jet a high speed stream of air to the hands in the drying chamber to blow off water on the hands, and thereby dry the hands.

Patent Literature 1 discloses a hand dryer apparatus that includes a casing including an air blow port and a hand insertion portion; an air blower unit including an air blower motor that supplies drying air through the air blow port into the hand insertion portion; a drain conductive plate placed in the casing near the hand insertion portion; and a detection unit that continuously detects changes over time in capacitance of the drain conductive plate. The hand dryer apparatus stops driving of the air blower motor when the capacitance of the drain conductive plate exceeds a predetermined threshold value.

CITATION LIST

Patent Literature

Patent Literature 1: Japanese Patent Application Laid-Open No. 2013-99396 (claims 7 to 9, FIGS. 2 and 14)

SUMMARY

Technical Problem

The hand dryer apparatus disclosed in Patent Literature 1 includes the drain conductive plate placed near the drain tank in the casing, and, when the detection unit, which continuously detects changes over time in capacitance of the drain conductive plate, detects the capacitance exceeding the predetermined threshold, the hand dryer apparatus determines that drain water accumulated in the drain tank exceeds a predetermined level; in such a case, the hand dryer apparatus can take actions such as stopping driving the air blower motor and providing a notification to a user.

In Patent Literature 1, the drain conductive plate is placed on the contour of the drain tank along its small vertical surface from the bottom to the top of the tank, which results in a small difference in capacitance between when the drain tank is empty and when it is full, and furthermore, the capacitance merely exhibits a linear and proportional increase from the empty tank condition to the full tank condition; thus, with consideration given to detection errors due to capacitance noise, the level at which a full tank condition is detected (the threshold value) has to be lowered considerably below the actual full tank condition. This poses a problem in that a full tank condition is detected when the tank is not actually full. Increasing the size of the drain tank with consideration given to the detection errors, instead of lowering the threshold value, leads a problem of increasing the external dimensions of the product.

The present invention has been achieved in view of the above, and an object of the present invention is to provide a hand dryer apparatus that can detect the quantity of water in a drain tank with high accuracy.

Solution to Problem

In order to solve the above problems and achieve the object, an aspect of the present invention is a hand dryer apparatus that includes: a housing that includes a hand insertion portion in which a user is allowed to insert a hand and a nozzle communicating with the hand insertion portion; a high-pressure air stream generation device placed inside the housing; a hand detection sensor that detects a hand of a user inserted into the hand insertion portion; a control unit that, when the hand detection sensor detects a hand of a user, allows the high-pressure air stream generation device to operate to cause an air stream to jet out from the nozzle to the hand insertion portion; and a drain tank that collects droplets blown off a hand of a user inserted into the hand insertion portion by an air stream jetting out from the nozzle and scattered in the hand insertion portion. The hand dryer apparatus includes: a drain conductive plate placed such that the drain conductive plate faces a surface that is one of surfaces forming a contour of the drain tank and has a largest area of all the surfaces; and a water detection unit that detects a water level of the drain tank on a basis of capacitance generated in the drain conductive plate.

Advantageous Effects of Invention

A hand dryer apparatus according to the present invention produces effects of being able to detect a change in capacitance due to a change in water level of a drain tank with high accuracy and being able to prevent an overflow from the drain tank.

DESCRIPTION OF EMBODIMENTS

Exemplary embodiments of a hand dryer apparatus according to the present invention will now be described in detail with reference the drawings. The present invention is not limited to the embodiments.

First Embodiment.

Figure 1:
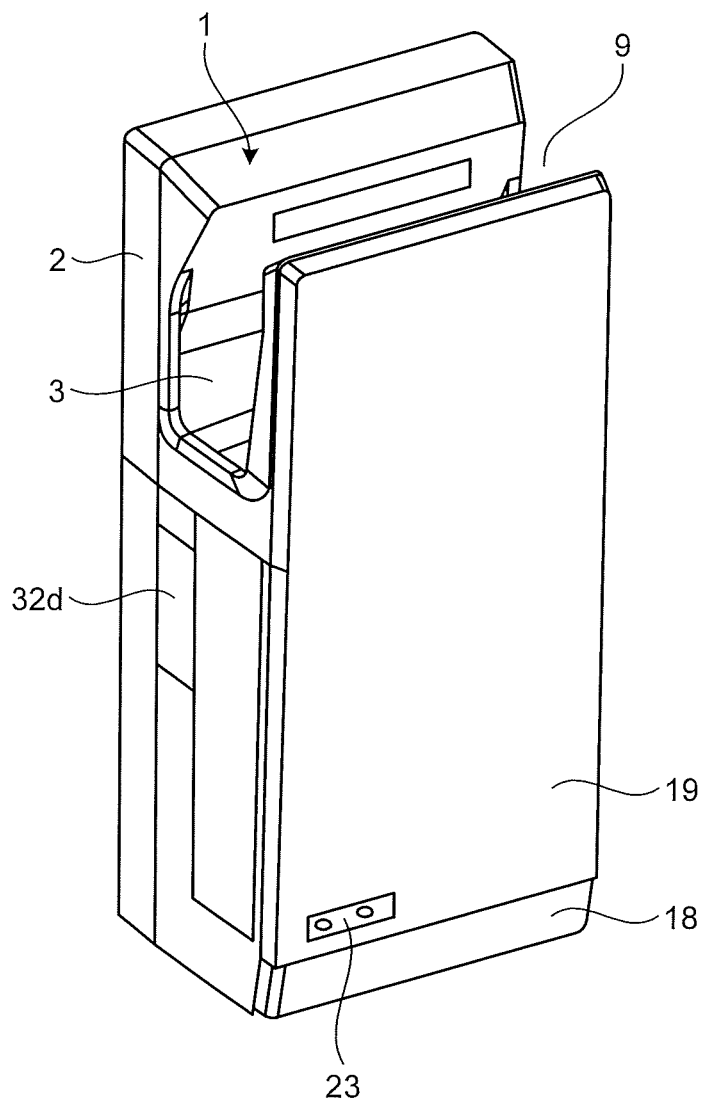
FIG. 1 is a perspective view of a hand dryer in a first embodiment of a hand dryer apparatus according to the present invention, as viewed from one side.
Figure 2:
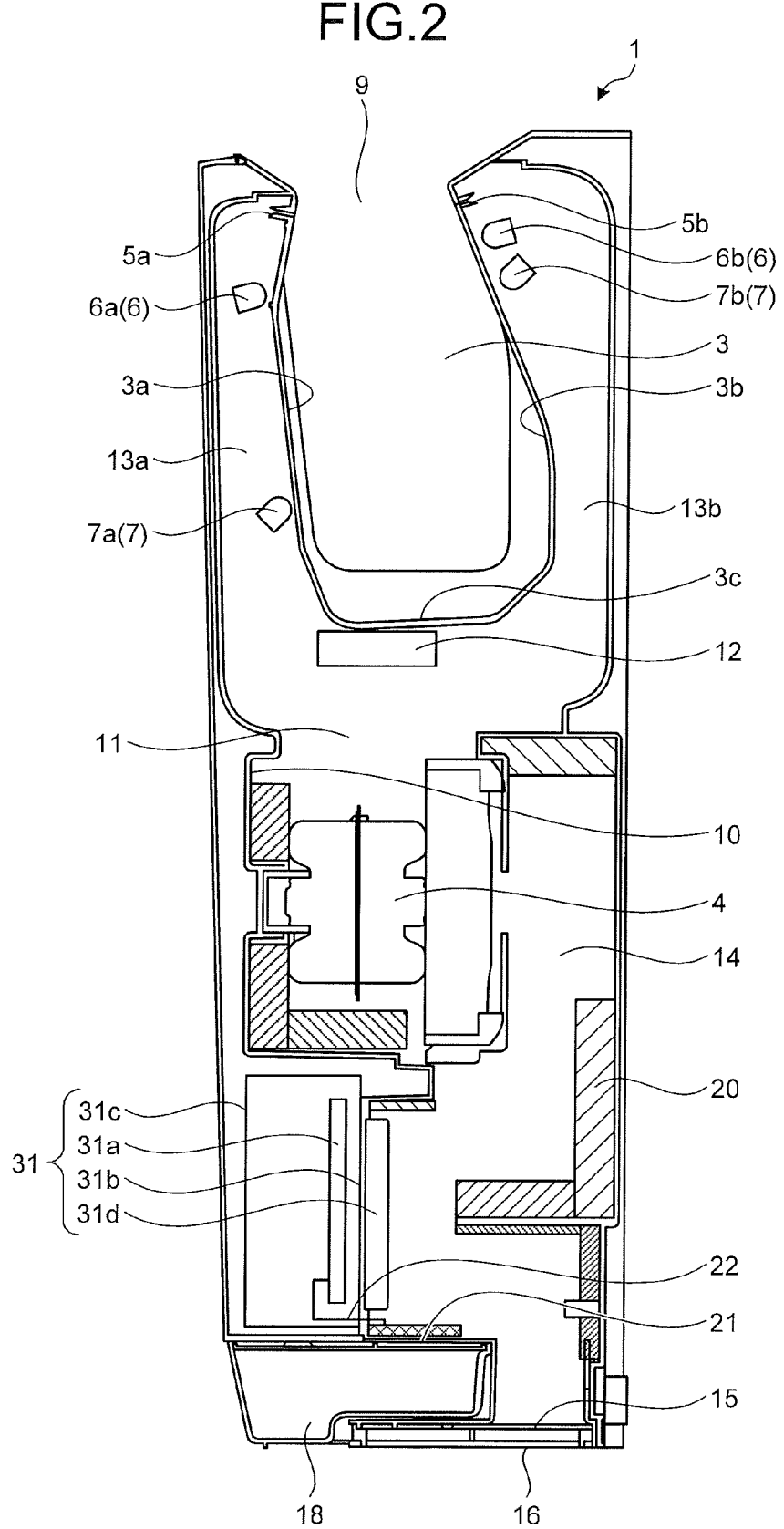
FIG. 2 is a sectional side view of the hand dryer according to the first embodiment.
Figure 3:
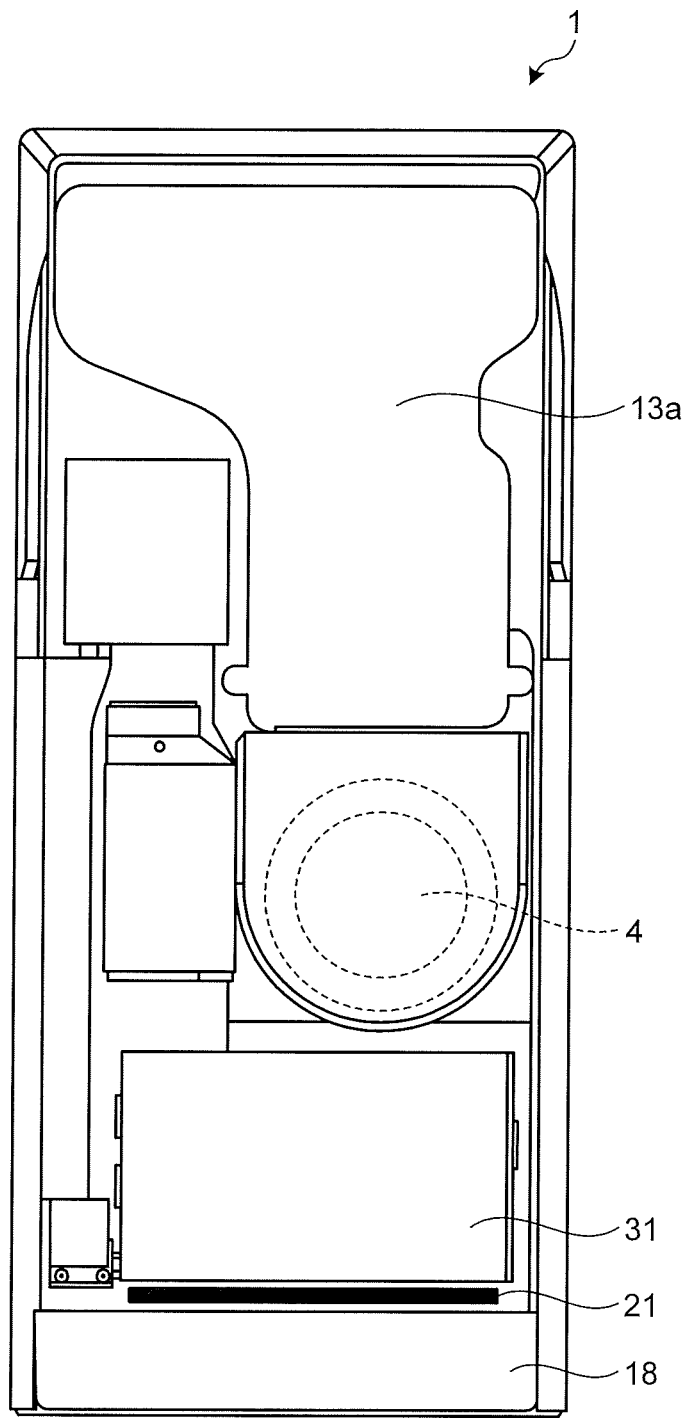
FIG. 3 is a front view of the hand dryer according to the first embodiment, with a front panel removed.
Figure 4:
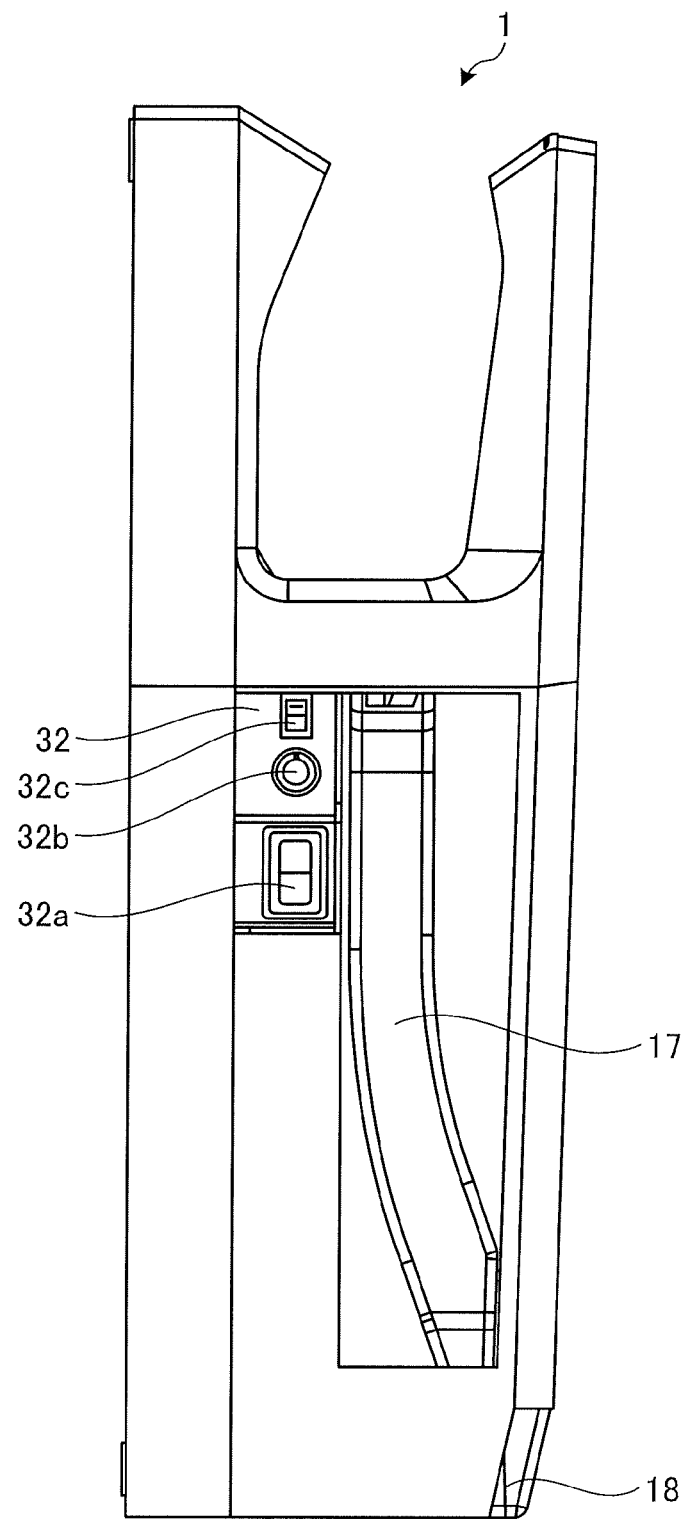
FIG. 4 is a perspective view of the hand dryer according to the first embodiment, as viewed from another side.
Figure 5:
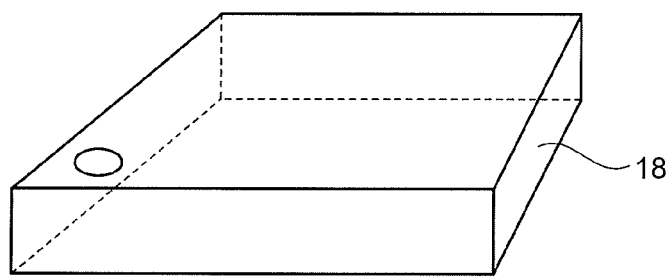
FIG. 5 is a perspective view of a drain tank.
Figure 6:
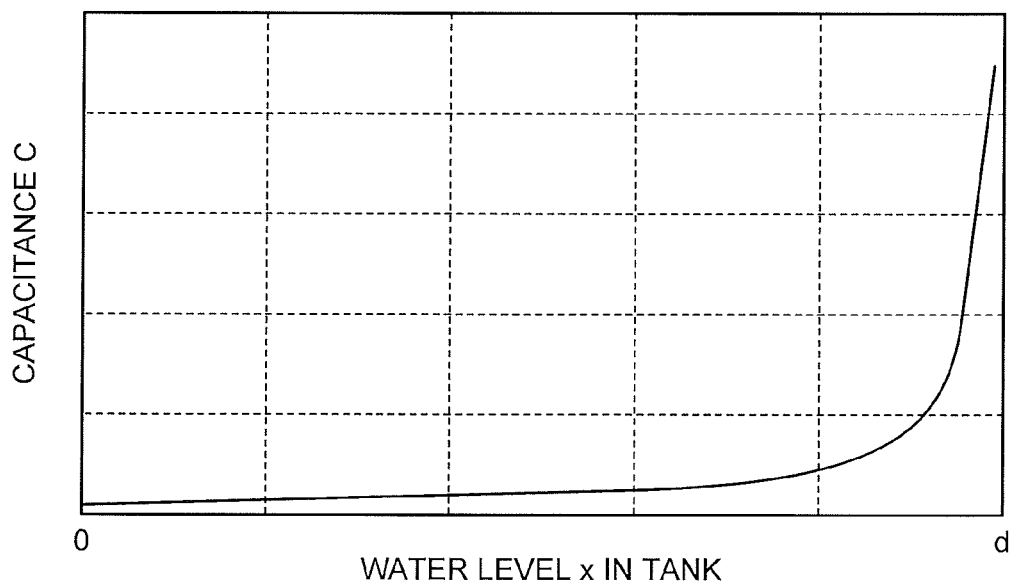
FIG. 6 is a diagram illustrating a relationship between a change in water level in the drain tank and a change in capacitance.

FIG. 1 is a perspective view of a hand dryer in a first embodiment of a hand dryer apparatus according to the present invention, as viewed from one side. FIG. 2 is a sectional side view of the hand dryer according to the first embodiment. FIG. 3 is a front view of the hand dryer according to the first embodiment, with a front panel removed. FIG. 4 is a perspective view of the hand dryer according to the first embodiment, as viewed from another side. FIG. 5 is a perspective view of a drain tank. FIG. 6 is a diagram illustrating a relationship between a change in water level in the drain tank and a change in capacitance.

As illustrated in FIG. 1, a hand dryer 1 is provided with an opening 9 in a housing 2, which forms the contour of the hand dryer 1. The opening 9 is an insertion opening through which a user of the hand dryer 1 inserts hands into the housing 2. As illustrated in FIG. 2, the housing 2 includes at the upper portion thereof a hand insertion portion 3, which is a space in which the user of the hand dryer 1 covers the hands inserted through the opening 9. The hand insertion portion 3 allows the user to insert the hands therein and remove the hands therefrom in up-down directions or crosswise directions at discretion. The hand insertion portion 3 has a U-shaped cross section as viewed from the side and is slightly tilted such that the upper portion of the hand insertion portion 3 is toward the front side and the lower portion thereof is toward the back side.

As described above, the hand insertion portion 3 has a U-shaped cross section, and its front wall 3a, which is an inner wall on the front side, and its rear wall 3b, which is an inner wall on the back side, face each other. The front wall 3a and the rear wall 3b are connected at their lowermost portions by a bottom wall 3c, which is an inner wall at the bottom side. In the manner described above, the hand insertion portion 3 has a U-shaped cross section having an opening in its upper portion and a closed bottom as viewed from the side. Additionally, as illustrated in FIG. 1, the hand insertion portion 3 is open at both sides in the width direction.

In the manner described above, the lower portion of the hand insertion portion 3 has a space surrounded by the front wall 3a, the rear wall 3b, and the bottom wall 3c. The upper portion of the hand insertion portion 3 has a space that is open at both of its sides with the front wall 3a and the rear wall 3b facing each other and allows a user to insert hands into the hand insertion portion 3 from outside the housing 2 and to remove the hands from the hand insertion portion 3.

The front wall 3a, the rear wall 3b, and the bottom wall 3c are made of resin impregnated with an antimicrobial agent. Additionally, the surfaces of the front wall 3a, the rear wall 3b, and the bottom wall 3c are covered with a water-repellent coating, such as a silicon coating and a fluorine coating, or a hydrophilic coating, such as a titanium oxide coating. This can prevent the front wall 3a, the rear wall 3b, and the bottom wall 3c of the hand insertion portion 3 from being soiled and suppresses the growth of bacteria thereon.

In the hand insertion portion 3, a front wall nozzle 5a, which jets out air, is placed in the upper portion of the front wall 3a in proximity to the opening 9 and a rear wall nozzle 5b, which jets out air, is placed in the upper portion of the rear wall 3b in proximity to the opening 9. The front wall nozzle 5a and the rear wall nozzle 5b face each other. The front wall nozzles 5a and the rear wall nozzles 5b are a plurality of holes placed in substantially straight lines in the width direction, with each hole formed like a slit extending in a wave shape in the width direction as viewed from the front. The front wall nozzles 5a and the rear wall nozzles 5b have their ends tilted slightly downward from the horizontal direction to form jetting angles at which the air jetting from the front wall nozzles 5a and the rear wall nozzles 5b is directed toward the lower portion (the depth side) of the hand insertion portion 3.

A first hand detection sensor 6 and a second hand detection sensor 7, which detect the presence of a hand in the hand insertion portion 3, are placed in the hand insertion portion 3. A first light-emitting element 6a, which detects the presence of a hand, is placed on the front wall 3a and below the front wall nozzles 5a and a second light-emitting element 7a is placed on the front wall 3a on the depth side of the hand insertion portion 3. A first light-receiving element 6b and a second light-receiving element 7b are placed on the rear wall 3b. The first light-emitting element 6a and the first light-receiving element 6b constitute the first hand detection sensor 6 and the second light-emitting element 7a and the second light-receiving element 7b constitute the second hand detection sensor 7.

The first hand detection sensor 6 and the second hand detection sensor 7 are both transmission type sensors. When a hand or another blocking object is not inserted into the hand insertion portion 3, infrared rays emitted from the first light-emitting element 6a and the second light-emitting element 7a travel unblocked to reach the first light-receiving element 6b and the second light-receiving element 7b, which receive the infrared rays directly. Hence, the reception levels of the infrared rays at the first light-receiving element 6b and the second light-receiving element 7b are high. In contrast, when a hand or another blocking object is inserted into the hand insertion portion 3, infrared rays emitted from the first light-emitting element 6a and the second light-emitting element 7a are blocked by the hand or the other blocking object. Hence, the first light-receiving element 6b and the second light-receiving element 7b cannot receive the infrared rays directly. Thus, the reception levels of the infrared rays at the first light-receiving element 6b and the second light-receiving element 7b are low. A microcomputer (not illustrated) included in a control unit 31, which will be described hereinafter, determines whether or not a hand is inserted into the hand insertion portion 3 on the basis of signals corresponding to the reception levels of infrared rays received by the first light-receiving element 6b and the second light-receiving element 7b.

The bottom wall 3c, which forms a bottom surface of the hand insertion portion 3, has a drain port (not illustrated) that drains water from the hand insertion portion 3 at the end of the bottom wall 3c in the width direction. An upper end of a drain passageway 17, which extends in the up-down direction of the housing 2, is attached to the drain port. The lower end of the drain passageway 17 is connected to a drain tank 18. The drain tank 18 is a tank that stores water drained through the drain passageway 17 and is removably attached to the bottom portion of the housing 2 such that the tank is attached and removed in the front-back direction. The drain tank 18 is hollow and has a hexahedron-like shape with its height smaller than its length or width such that the sectional area through the horizontal plane is the largest; in other words, the drain tank 18 has a hexahedron box-like shape with its top and bottom surfaces having the largest areas of the surfaces forming its contour.

A drain conductive plate 21 is attached in the housing 2 above the drain tank 18 in the substantially horizontal direction with a partition wall of the housing 2 disposed between the drain conductive plate 21 and the drain tank 18. That is, the drain conductive plate 21 and the surface of the water in the drain tank 18 are substantially parallel with each other. The drain conductive plate 21 is an electric conductor made of a metallic thin plate. The drain conductive plate 21 is smaller than the top surface of the drain tank 18 and placed on the drain tank 18 such that it is within the top surface of the drain tank 18 as viewed from the top. For example, the drain conductive plate 21 has a shape similar to that of the top surface of the drain tank 18 and a size smaller than that of the top surface of the drain tank 18. An electric wire 22 connected to a control circuit 31a is connected to the drain conductive plate 21. The purpose of the electric wire 22 is to transmit a change in capacitance to the control circuit 31a and the electric wire 22 may be a solid wire (a core wire) or a stranded wire. The electric wire 22 is placed such that the drain conductive plate 21 is connected to the control circuit 31a through the shortest possible path in order to minimize the possibility of erroneous detection in response to external electrical noise.

In the present embodiment, the drain conductive plate 21 can be implemented with a printed board having copper foil printed on a board, a metallic planer plate electrode, or the like, although the drain conductive plate 21 is not limited to them. For example, the drain conductive plate 21 may be a line-like conductor, in place of a plate-like conductor, and may be a line-like conductor bent in a zigzag.

As illustrated in FIG. 2, a high-pressure air stream generation device 4, which generates high pressure air, is placed inside the housing 2 and below the hand insertion portion 3. Air having a pressure increased by the high-pressure air stream generation device 4 is discharged to an air outlet chamber 10 placed above the high-pressure air stream generation device 4. The air outlet chamber 10 surrounds the air outlet side of the high-pressure air stream generation device 4. The air outlet chamber 10 has at its upper portion an air outlet port 11, through which the air in the air outlet chamber 10 is discharged, and an electric heater 12, which heats up the high pressure air generated by the high-pressure air stream generation device 4 and discharged into the air outlet chamber 10, is placed at the air outlet port 11. The air outlet port 11 is connected to a front air outlet duct 13a and a rear air outlet duct 13b, which are branched air passageways on the front side and the back side of the housing 2. The front air outlet duct 13a extends upward from the air outlet port 11 on the near side of the front wall 3a of the hand insertion portion 3 and the rear air outlet duct 13b extends upward from the air outlet port 11 behind the rear wall 3b of the hand insertion portion 3. The front air outlet duct 13a is connected at its upper end to the front wall nozzles 5a placed in the front wall 3a and the rear air outlet duct 13b is connected at its upper end to the rear wall nozzles 5b placed in the rear wall 3b. This allows the high pressure air discharged by the high-pressure air stream generation device 4 to pass through the air outlet chamber 10, the air outlet port 11, and the front air outlet duct 13a, to be turned into high speed air by the front wall nozzles 5a, and to be then jetted out of the front wall nozzles 5a into the hand insertion portion 3. The high pressure air discharged by the high-pressure air stream generation device 4 is also allowed to pass through the air outlet chamber 10, the air outlet port 11, and the rear air outlet duct 13b, to be turned into high speed air by the rear wall nozzles 5b, and to be then jetted out of the rear wall nozzles 5b into the hand insertion portion 3.

An upper end of an air inlet duct 14, which extends in the up-down direction of the housing 2, is connected to the high-pressure air stream generation device 4 on the air inlet side of the high-pressure air stream generation device 4. A sound absorbing material 20 is affixed to the inner wall of the air inlet duct 14 to reduce noise from the high-pressure air stream generation device 4. The air inlet duct 14 extends to the bottom portion of the housing 2 such that the lower end of the air inlet duct 14 is connected to an air inlet port 15, which opens downward in the bottom portion of the housing 2. An air filter 16 is removably attached to the entrance of the air inlet port 15. A front panel 19 is attached to the front of the housing 2.

The control unit 31 of the hand dryer 1 will be described below. The control unit 31 is placed in the housing 2 and below the high-pressure air stream generation device 4. The control unit 31 includes the control circuit 31a, which controls operations and the like of the high-pressure air stream generation device 4 and the electric heater 12; a case 31b, which accommodates the control circuit 31a; a cover 31c, which protects the control circuit 31a; and a radiator 31d.

The control circuit 31a employs relatively large electronic components, such as a switching element, including an FET (Field Effect Transistor) element and an IGBT (Insulated Gate Bipolar Transistor) element, and an electrolytic capacitor. A switching element on the control circuit 31a produces heat while the high-pressure air stream generation device 4 is operated; thus, it is necessary to dissipate the produced heat to prevent a failure. The radiator 31d is a component typically provided to dissipate heat generated by a switching element. In the present embodiment, the radiator 31d is in close contact with the switching element in the control circuit 31a of the high-pressure air stream generation device 4. The radiator 31d is inserted into the air inlet duct 14 so that the radiator 31d is cooled down by an air stream flowing through the air inlet duct 14 during the operation of the high-pressure air stream generation device 4. The radiator 31d is made of aluminum having a high thermal conductivity and has a fin.

The control unit 31 controls the operation of the high-pressure air stream generation device 4 on the basis of signals output from the first light-receiving element 6b and the second light-receiving element 7b, which are placed in the hand insertion portion 3 and detect the presence of a hand in the hand insertion portion 3. The control unit 31 enables an air stream generated by the high-pressure air stream generation device 4 to jet out into the hand insertion portion 3 from the front wall nozzles 5a and the rear wall nozzles 5b placed in the front wall 3a and the rear wall 3b, which are inner walls of the hand insertion portion 3.

An operation unit 32 of the hand dryer 1 will be described below. As illustrated in FIG. 4, the operation unit 32 is placed on one side (for example, the left side) of the housing 2 such that the operation unit 32 can be operated from the outside. An openable door 32d is placed over the operation unit 32, and, when the door 32d is opened, placed inside are a power switch 32a, which turns on/off the power of the hand dryer 1; an air volume regulation switch 32b, which regulates the air volume while the high-pressure air stream generation device 4 is operated; and a heater switch 32c, which turns on/off the electric heater 12.

The operation of the hand dryer 1 will be described below. A user of the hand dryer 1 stands on the front side of the hand dryer 1 and inserts wet hands into the hand insertion portion 3 through the opening 9 placed in the upper portion of the hand dryer 1. As the hands advance toward the lower portion (the depth side) of the hand insertion portion 3, fingertips of the inserted hand or the like blocks an infrared ray emitted from the second light-emitting element 7a and the microcomputer (not illustrated) of the control circuit 31a then determines that a hand is inserted into the hand insertion portion 3. The microcomputer then provides an instruction that the high-pressure air stream generation device 4 start operating. Upon activation of the high-pressure air stream generation device 4, external air with dust removed as the air passing through the air filter 16 is drawn from the air inlet port 15 through the air inlet duct 14 into the air inlet side of the high-pressure air stream generation device 4. The high-pressure air stream generation device 4 generates high pressure air from the air drawn in this manner.

The high pressure air having a pressure increased by the high-pressure air stream generation device 4 is discharged from the air outlet side of the high-pressure air stream generation device 4 into the air outlet chamber 10. If the heater switch 32c is on at this point in time, a part of the high pressure air is heated as it passes by the electric heater 12. The part of the high pressure air that is heated when passing by the electric heater 12 and a part of the high pressure air that does not pass by the electric heater 12 after passing through the air outlet port 11 are mixed and split into streams that pass through the front air outlet duct 13a and the rear air outlet duct 13b. The warm high pressure air passing through the front air outlet duct 13a and the rear air outlet duct 13b is turned into high speed air by the front wall nozzles 5a placed in the front wall 3a and the rear wall nozzles 5b placed in the rear wall 3b. The warm high speed air is jetted out by the front wall nozzles 5a and the rear wall nozzles 5b into the hand insertion portion 3.

Since the front wall nozzles 5a and the rear wall nozzles 5b are placed in substantially straight lines in the width direction of the hand insertion portion 3 in proximity to the opening 9, high speed air in a form like air curtains extending in the width direction of the hand insertion portion 3 is jetted out in proximity to the opening 9. The air-curtain like high speed air hits the wrist of the user inserted into the hand insertion portion 3 or portions of the back and the palm of the hand near the wrist, so that water on the front and back of the hand is blown off to droplets.

The jetting of the front wall nozzles 5a and the rear wall nozzles 5b is in directions that are tilted slightly downward from the horizontal direction and toward the depth side of the hand insertion portion 3. Hence, the high speed air jetting out from the front wall nozzles 5a and the rear wall nozzles 5b is jetted in directions tilted slightly downward from the horizontal direction, that is, toward the depth side of the hand insertion portion 3. In other words, the high speed air collides with the hand not perpendicularly but at angles tilted toward the fingertips (downward). After the collision with the hand, much of the high speed air jetting out from the front wall nozzles 5a and the rear wall nozzles 5b thus flows along the hand from the wrist toward the fingertips, and much of the water on the hand also flows along the hand from the wrist toward the fingertips. Upon arrival at the fingertips, the water comes off the fingertips in droplets in proximity to the bottom portion of the hand insertion portion 3, and many of the droplets are blown downward, that is, toward the bottom wall 3c of the hand insertion portion 3.

The droplets blown off the wet hand hit the front wall 3a, the rear wall 3b, or the bottom wall 3c of the hand insertion portion 3. The droplets that hit the front wall 3a and the rear wall 3b flow downward toward the bottom wall 3c, which is the bottom portion of the hand insertion portion 3, into the drain port (not illustrated) placed in the bottom wall 3c of the hand insertion portion 3, and then pass through the drain passageway 17 to be collected in the drain tank 18.

When the user pulls the hands from the hand insertion portion 3, which causes the light emitted by the first light-emitting element 6a to reach the first light-receiving element 6b, the control circuit 31a stops the high-pressure air stream generation device 4.

Users repeating the hand drying operation described above increases the water accumulated in the drain tank 18, which raises the water level (that is, the surface of the water).

A method of detecting the quantity of water in the drain tank 18 as capacitance will be described below using a capacitor as an equivalence of the configuration of the hand dryer 1 of the present embodiment. It is widely known that the capacitance C of a capacitor that is made of flat plates with a dielectric substance having the same area with the flat plates interposed between the flat plates can be expressed by the following expression (1) where C0 is the capacitance of the capacitor, ∈0 is the dielectric constant of the capacitor, S is the area of the flat plates, d is the distance between the flat plates, ∈r is the relative dielectric constant of the dielectric substance, and x is the thickness of the dielectric substance.

$$C = \frac{\varepsilon_r \varepsilon_0 S}{\varepsilon_0(d-x)+x} = \frac{\varepsilon_r d}{\varepsilon_r(d-x)+x} C_0 \quad (1)$$

In the present embodiment, the drain conductive plate 21 can be an equivalence of the electrode, the water accumulated in the drain tank 18 can be an equivalence of the dielectric substance, and the water level of the drain tank 18 can be an equivalence of the thickness of the dielectric substance interposed between the electrodes. For a specific conductor, it is assumed that a conductor that surrounds it and is located at infinity is the other conductor. For an object on the earth, the capacitance means the capacitance to the earth (earth capacitance). In the present embodiment, the drain tank 18, the drain conductive plate 21, the control unit 31, and the like each have earth capacitance; as water, which is a dielectric substance, approaches the drain conductive plate 21, a change in capacitance from that with the reference voltage of the circuit is finally detected.

FIG. 6 is a diagram illustrating the expression (1) in a graph with x having changing quantities in the range of x<d. As apparent from FIG. 6, water, which is a dielectric substance, being accumulated in the drain tank 18 with the water level rising from an empty tank condition is equivalent to x increasing in the expression (1), which causes the value of the capacitance C to increase; as the surface of the water in the drain tank 18 approaches a full tank condition, in other words, as its distance to the drain conductive plate 21 is reduced, the capacitance C changes more significantly. Hence, the location of the drain conductive plate 21 above and in proximity of the position of the full tank condition enables the full tank condition to be detected with high accuracy. If the value of the capacitance, which is continuously detected by the drain conductive plate 21, increases in association with the change in quantity of water in the drain tank 18 and exceeds a preset threshold value, the control circuit 31a determines that the quantity of the water in the drain tank 18 is in a full tank condition.

The drain conductive plate 21 is placed such that it faces the surface that is one of the surfaces forming the contour of the drain tank 18 and has the largest area of all the surfaces; thus, the drain conductive plate 21 can detect the largest area of the water stored in the drain tank 18 and thereby detect the water in the drain tank 18 with high accuracy. Additionally, the drain conductive plate 21 is placed above the drain tank 18, and the distance from the drain conductive plate 21 to the surface of the water decreases as the water in the drain tank 18 increases; thus, whether or not the water stored in the drain tank 18 is in a full tank condition can be detected with high accuracy.

If the control circuit 31a determines that the drain tank 18 is in a full tank condition, it can cause an indicator unit 23 to turn on or flash in order to notify a user of the full tank condition and thereby encourage maintenance of discarding the accumulated water. The control circuit 31a can also cause blowing of air to be stopped in order to prevent an overflow from the drain tank 18 and thereby maintain a hygienic environment. The unit to notify a user of a full tank condition is not limited to the indicator unit 23 and it may be a speaker or the like that generates an alarm sound.

Additionally, by providing a device that can perform wireless communication in the control circuit 31a, a full tank condition of the drain tank 18 can be communicated to an external device in order to make a facilities manager aware of the condition and thereby encourage discarding of water in the drain tank 18. A publicly known type of wireless communication standards, such as Wi-Fi and Bluetooth (registered trademark), can be employed as the wireless communication; however, it is not limited to any specific type. The method of communicating to an external device may be, for example, by sending an e-mail to the facilities manager or by indicating the full tank condition of the drain tank 18 on a smartphone with a special application installed therein.

The drain conductive plate 21 is smaller than the top surface of the drain tank 18 and placed above the drain tank 18 such that the drain conductive plate 21 is within the horizontal surface of projection of the drain tank 18 as viewed from the top; thus, if the drain tank 18 is not fully inserted during the installation, the drain conductive plate 21 can detect the same capacitance as that detected when the drain tank 18 is correctly inserted. That is, even if the drain tank 18 is not fully inserted, the whole surface of the drain conductive plate 21 faces the surface of the water in the drain tank 18 and thus can detect the same capacitance as that detected when the drain tank 18 is correctly inserted.

The drain conductive plate 21 is placed such that it faces the top surface of the drain tank 18 in the example above, although the drain conductive plate 21 may have a shape similar to that of the top surface of the drain tank 18 and a size smaller than that of the top surface of the drain tank 18 and be placed such that the drain conductive plate 21 is within the top surface of the drain tank 18.

While the sensors to detect an inserted hand are optical type in the present embodiment, this is not a limitation. For example, a capacitance type sensor may be used.

Second Embodiment.

Figure 7:
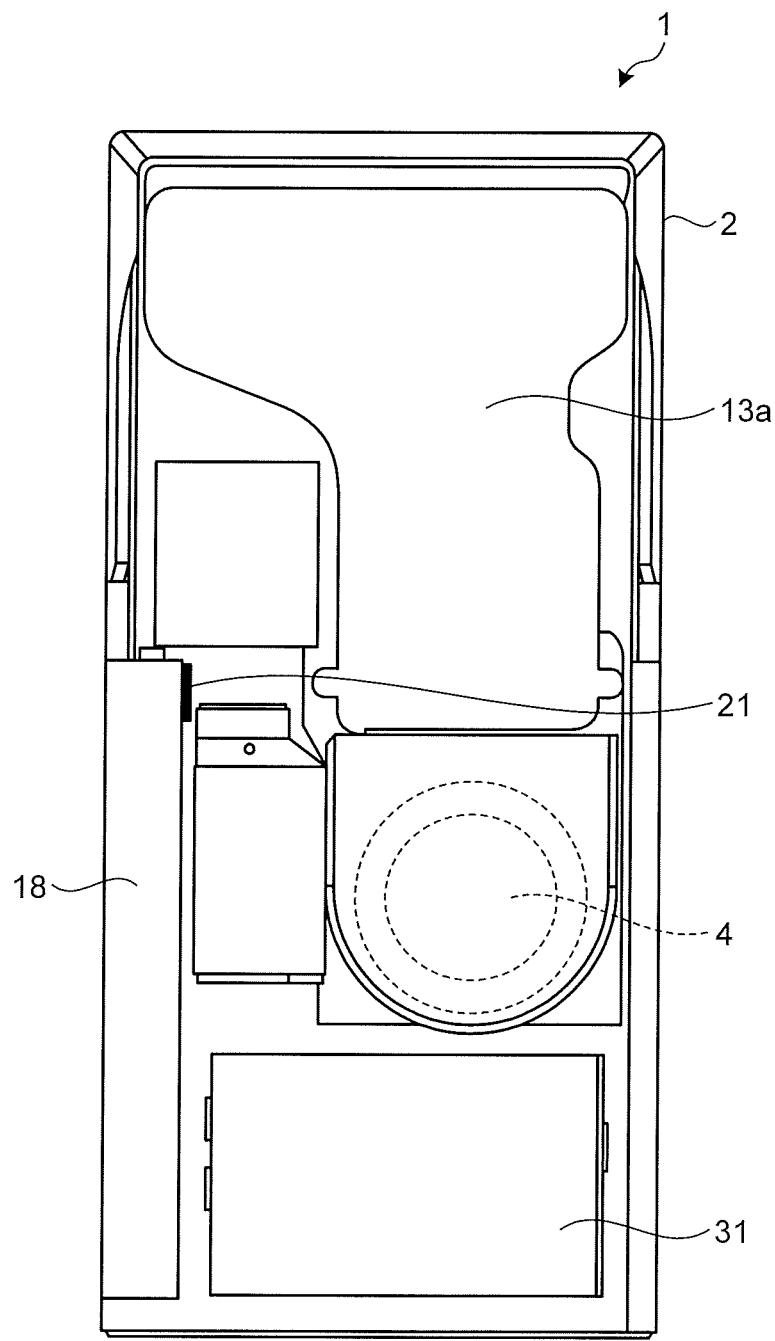
FIG. 7 is a front view of a hand dryer as a second embodiment of a hand dryer apparatus according to the present invention, with a front panel removed.
Figure 8:
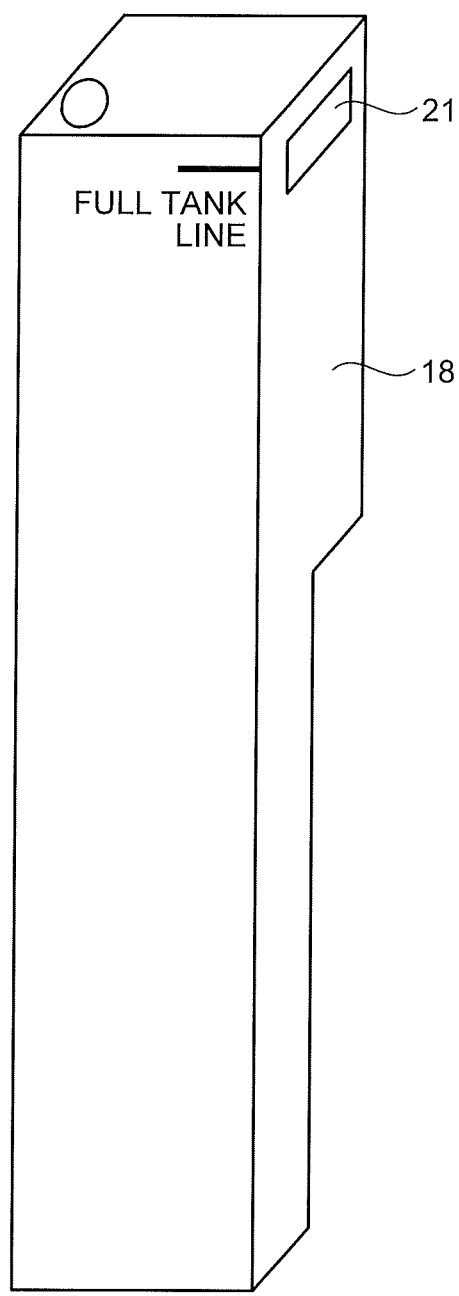
FIG. 8 is a diagram illustrating a positional relationship between a drain tank and a drain conductive plate of the hand dryer according to the second embodiment.

FIG. 7 is a front view of a hand dryer as a second embodiment of a hand dryer apparatus according to the present invention, with a front panel removed. FIG. 8 is a diagram illustrating a positional relationship between a drain tank and a drain conductive plate of the hand dryer according to the second embodiment. As illustrated in FIGS. 7 and 8, the hand dryer 1 according to the second embodiment includes the drain tank 18 at the side of the housing 2, with a drain passageway eliminated. That is, the drain port (not illustrated) placed at the lateral end of the hand insertion portion 3 is connected to the drain tank 18. The drain tank 18 is shaped such that the area of the side surface thereof is the largest. The difference from the first embodiment is that the drain conductive plate 21 is placed in proximity only to the full water level, with the drain conductive plate 21 facing the side surface of the drain tank 18, such that the capacitance starts changing only when the water level of the drain tank 18 is close to the full water level. That is, the drain conductive plate 21 is placed above the middle of the drain tank 18 in the vertical direction and along the vertical surface of the drain tank 18. Differences from the first embodiment only will be described below, with the description of common parts omitted.

In the second embodiment, when the quantity of water accumulated in the drain tank 18 is small, no water is present at the position facing the drain conductive plate 21 and thus the drain conductive plate 21 measures stray capacitance in a space in this situation. Users repeating the hand drying operation raise the water level of the drain tank 18. When the water level is close to the full water level, which means that water, a dielectric substance, is present at the position facing the drain conductive plate 21, a significant change is caused to the capacitance, allowing the drain conductive plate 21 to detect the full tank condition of the drain tank 18.

Although the drain conductive plate 21 is placed on the side surface that is one of the surfaces forming the contour of the drain tank 18 and has the largest area of all the surfaces, the drain conductive plate 21 can be placed in proximity only to the full water level, which enables a reduction in size and in manufacturing cost of the drain conductive plate 21. Additionally, the presence of water, not a change in water level, should be detected, which allows a low sensitivity for a setting and thereby provides insusceptibility to external noise.

The remainder is similar to the first embodiment.

Third Embodiment.

Figure 9:
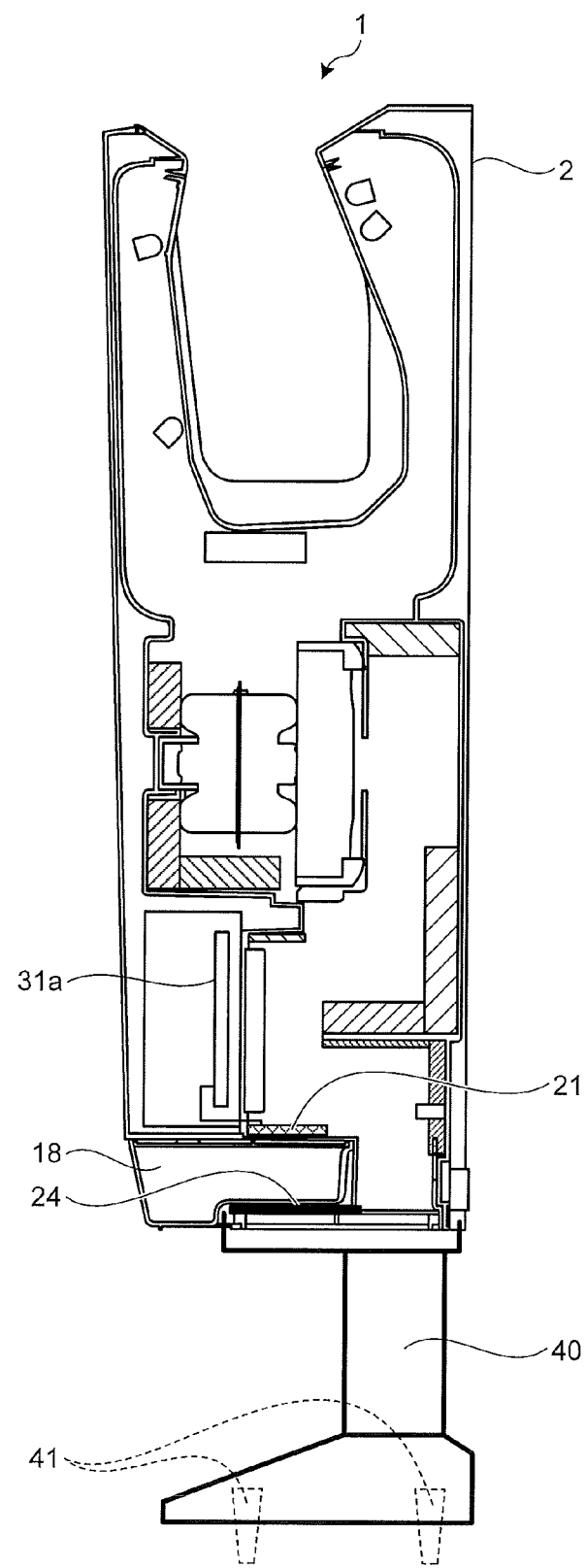
FIG. 9 is a sectional side view of a hand dryer according to a third embodiment.

FIG. 9 is a sectional side view of a hand dryer according to a third embodiment. The hand dryer 1 according to the third embodiment is different from the first embodiment in that the hand dryer 1 can support itself with an installation stand 40, which is an additional component, attached below the housing 2 and that a shielding plate 24, which is grounded, is placed below the drain tank 18. Differences from the first embodiment only will be described below, with the description of common parts omitted.

The hand dryer 1 can support itself with the special installation stand 40 connected to the hand dryer 1 such that the installation stand 40 is below the housing 2. When the hand dryer 1 is installed with the installation stand 40, the installation stand 40 is secured to the surface of the floor at the installation position with anchors 41 in order to prevent the hand dryer 1 from falling. The shielding plate 24 faces the bottom surface of the drain tank 18, with the drain tank 18 interposed between the shielding plate 24 and the drain conductive plate 21. The shielding plate 24 is positioned between the installation stand 40 and the drain conductive plate 21 and is grounded, such that the installation stand 40 causes no change to the capacitance between the drain conductive plate 21 and the conductor assumed to be present at infinity. This enables the control circuit 31a to detect a change in capacitance between the drain conductive plate 21 and the conductor assumed to be present at infinity with high accuracy with no influence from the added installation stand 40.

While the installation stand 40 is used as an example of optional components connected below the housing 2 in the third embodiment, a heater unit including a thermal storage type heater, a filter box including a filter with good dust removal efficiency, and the like may be employed; the shielding plate 24 can neutralize a change in capacitance caused by these optional components.

Furthermore, the shielding plate 24 is grounded in the third embodiment, although it may not be grounded if the shielding plate has a sufficiently large area or thickness, or if a change in capacitance caused by an optional component to be connected is insignificant.

INDUSTRIAL APPLICABILITY

As described above, a hand dryer apparatus according to the present invention is useful in that it can detect a water level in a drain tank accurately.

REFERENCE SIGNS LIST

1 hand dryer, 2 housing, 3 hand insertion portion, 3a front wall, 3b rear wall, 3c bottom wall, 4 high-pressure air stream generation device, 5a front wall nozzle, 5b rear wall nozzle, 6 first hand detection sensor, 6a first light-emitting element, 6b first light-receiving element, 7 second hand detection sensor, 7a second light-emitting element, 7b second light-receiving element, 9 opening, 10 air outlet chamber, 11 air outlet port, 12 electric heater, 13a front air outlet duct, 13b rear air outlet duct, 14 air inlet duct, 15 air inlet port, 16 air filter, 17 drain passageway, 18 drain tank, front panel, 20 sound absorbing material, 21 drain conductive plate, 22 electric wire, 23 indicator unit, 24 shielding plate, 31 control unit, 31a control circuit, 31b case, 31c cover, 31d radiator, 32 operation unit, 32a power switch, 32b air volume regulation switch, 32c heater switch, 32d door, 40 installation stand, 41 anchor.

The invention claimed is:

1. A hand dryer apparatus that comprises:
   a housing that includes a hand insertion portion in which a user is allowed to insert a hand and a nozzle communicating with the hand insertion portion;
   a high-pressure air stream generation device placed inside the housing;
   a hand detection sensor that detects a hand of a user inserted into the hand insertion portion;
   a control unit that, when the hand detection sensor detects a hand of a user, allows the high-pressure air stream generation device to operate to cause an air stream to jet out from the nozzle to the hand insertion portion; and
   a drain tank that collects droplets blown off a hand of a user inserted into the hand insertion portion by an air stream jetting out from the nozzle and scattered in the hand insertion portion,
   the hand dryer apparatus comprising:
      a drain conductive plate placed such that the drain conductive plate faces a surface that is one of surfaces forming a contour of the drain tank and has a largest area of all the surfaces; and
      a water detection unit that detects a water level of the drain tank on a basis of capacitance generated in the drain conductive plate.

2. The hand dryer apparatus according to claim 1, wherein the drain tank has a hexahedron box-like shape having top and bottom surfaces having largest areas of all the surfaces forming the contour of the drain tank, and
   the drain conductive plate is placed above the drain tank.

3. The hand dryer apparatus according to claim 2, wherein the drain conductive plate is smaller than the top surface of the drain tank.

4. The hand dryer apparatus according to claim 1, wherein, when the water detection unit detects the water level of the drain tank exceeding a preset water level, the control unit causes the high-pressure air stream generation device not to operate.

5. The hand dryer apparatus according to claim 1, further comprising an notification unit that notifies a user of information, wherein
   when the water detection unit detects the water level of the drain tank exceeding a preset water level, the notification unit notifies a user of the water level of the drain tank exceeding the preset water level.

6. The hand dryer apparatus according to claim 1, further comprising a wireless communication unit that performs wireless communication with an external device, wherein
   when the water detection unit detects the water level of the drain tank exceeding a preset water level, the wireless communication unit communicates the water level of the drain tank exceeding the preset water level to the external device.

7. A hand dryer apparatus that comprises:
   a housing that includes a hand insertion portion in which a user is allowed to insert a hand and a nozzle communicating with the hand insertion portion;
   a high-pressure air stream generation device placed inside the housing;
   a hand detection sensor that detects a hand of a user inserted into the hand insertion portion;
   a control unit that, when the hand detection sensor detects a hand of a user, allows the high-pressure air stream generation device to operate to cause an air stream to jet out from the nozzle to the hand insertion portion; and
   a drain tank that collects droplets blown off a hand of a user inserted into the hand insertion portion by an air stream jetting out from the nozzle and scattered in the hand insertion portion,
   the hand dryer apparatus comprising:
      a drain conductive plate placed above a middle of the drain tank in a vertical direction and along a vertical surface of the drain tank; and
      a water detection unit that detects a water level of the drain tank on a basis of capacitance generated in the drain conductive plate.

8. The hand dryer apparatus according to claim 1, wherein the housing has a bottom surface that is connectable to an additional component, and
   a shielding plate that prevents the additional component from generating capacitance in the drain conductive plate is placed between the drain tank and the bottom surface of the housing.

\* \* \* \* \*